United States Patent [19]
Sutherland

[11] Patent Number: 6,145,864
[45] Date of Patent: Nov. 14, 2000

[54] SAFETY APPARATUS FOR PIVOTABLY COUPLED VEHICLES

[75] Inventor: Daniel R. Sutherland, Sterling Heights, Mich.

[73] Assignee: TRW Vehicle Safety Systems Inc., Lyndhurst, Ohio

[21] Appl. No.: 09/176,185

[22] Filed: Oct. 21, 1998

[51] Int. Cl.[7] .................................................. B62D 53/06
[52] U.S. Cl. .................... 280/432; 280/433; 280/451; 280/468
[58] Field of Search .................................. 280/432, 433, 280/438.1, 449, 451, 468, 755, 423.1

[56] References Cited

U.S. PATENT DOCUMENTS

| | | | |
|---|---|---|---|
| 2,360,902 | 10/1944 | Simmons | 280/468 |
| 2,815,224 | 12/1957 | Waters | 280/432 |
| 3,982,413 | 9/1976 | Stone et al. | |
| 3,994,510 | 11/1976 | Howard | |
| 4,079,959 | 3/1978 | Vance | 280/432 |
| 4,254,967 | 3/1981 | Scanlon | |
| 4,262,920 | 4/1981 | Mettetal | |
| 4,269,426 | 5/1981 | Bhushan | |
| 4,455,036 | 6/1984 | Barr | |
| 4,592,565 | 6/1986 | Eagle | 280/755 |
| 4,720,118 | 1/1988 | Schultz et al. | |
| 4,952,908 | 8/1990 | Sanner | |
| 5,630,605 | 5/1997 | Smallwood | 280/432 |

FOREIGN PATENT DOCUMENTS

| | | | |
|---|---|---|---|
| 212163 | 11/1960 | Austria | 280/449 |
| 1622216 | 1/1991 | U.S.S.R. | 280/449 |

*Primary Examiner*—Anne Marie Boehler
*Attorney, Agent, or Firm*—Tarolli, Sundheim, Covell, Tummino & Szabo L.L.P.

[57] ABSTRACT

A safety device (30) is actuatable to uncouple a first vehicle (10) from a second vehicle (12) to which the first vehicle (10) is coupled by a pivotable joint. An actuating apparatus (70, 72) senses and responds to a specified vehicle crash condition by actuating the safety device (30). Preferably, an additional safety device (32) is actuatable to roll the vehicles (10, 12) relative to one another. The actuating apparatus (70, 72) further responds to the specified vehicle crash condition by actuating the additional safety device (32).

16 Claims, 2 Drawing Sheets

SAFETY APPARATUS FOR PIVOTABLY COUPLED VEHICLES

FIELD OF THE INVENTION

The present invention relates to vehicles that are coupled together by a pivotable joint.

BACKGROUND OF THE INVENTION

A pair of vehicles that are pivotably coupled to one another, such as a tractor joined to a semitrailer, may experience a jackknife or other crash that causes one or both of the vehicles to roll.

SUMMARY OF THE INVENTION

In accordance with a principal feature of the present invention, a safety device is actuatable to uncouple a first vehicle from a second vehicle to which the first vehicle is coupled by a pivotable joint. An actuating apparatus senses and responds to a specified vehicle crash condition by actuating the safety device.

In accordance with another principal feature of the present invention, a safety device is actuatable to roll a first vehicle relative to a second vehicle to which the first vehicle is coupled by a pivotable joint. An actuating apparatus senses and responds to a specified vehicle crash condition by actuating the safety device.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
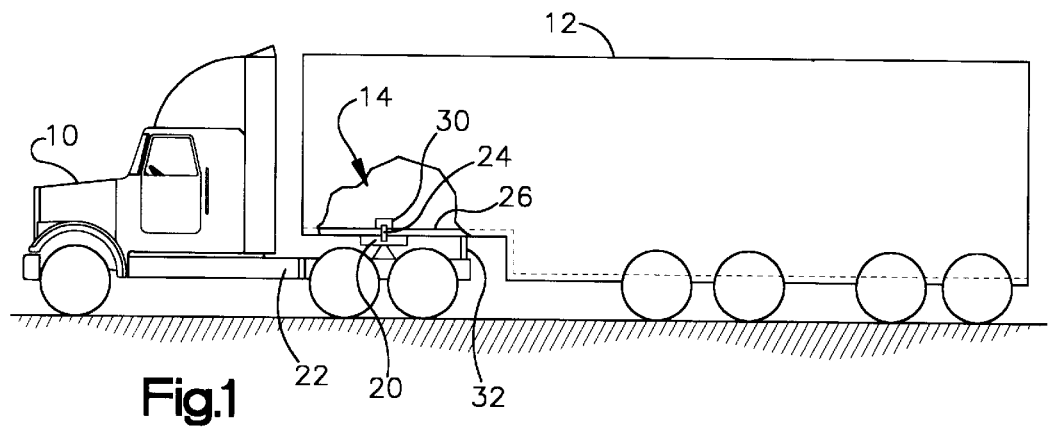
FIG. 1 is a view of an apparatus comprising a preferred embodiment of the present invention, with certain parts being shown schematically.

FIG. 1 shows a pair of vehicles 10 and 12 coupled together by a pivotable joint. The vehicles 10 and 12 are equipped with a safety system 14 comprising a preferred embodiment of the present invention.

As shown by way of example in FIG. 1, the first vehicle 10 is a particular type of truck that may be referred to as a tractor. The second vehicle 12 is a semitrailer. A "fifth wheel" coupling device 20 is mounted on the chassis 22 of the tractor 10. A king pin 24 projects downward from the chassis 26 of the semitrailer 12. The king pin 24 is releasably interlocked with the fifth wheel 20 in a known manner. The semitrailer 12 is thus pivotably coupled with the tractor 10 to be towed by the tractor 10.

The safety system 14 operates in accordance with the present invention to uncouple the semitrailer 12 from the tractor 10 upon the occurrence of a crash. Specifically, the safety system 14 includes a disconnect device 30 which is actuatable to disconnect the king pin 24 from the trailer chassis 26, and thereby to uncouple the semitrailer 12 from the tractor 10. This enables the tractor 10 to continue its forward motion separately from the semitrailer 12.

Preferably, the safety system 14 further includes a pair of rolling devices 32, one of which is visible in the side view of FIG. 1. When the rolling devices 32 are actuated, they cause the semitrailer 12 to roll away from the tractor 10. This helps to stabilize the tractor 10 and also helps to ensure that the semitrailer 12 is fully separated from the tractor 10.

Figure 2:
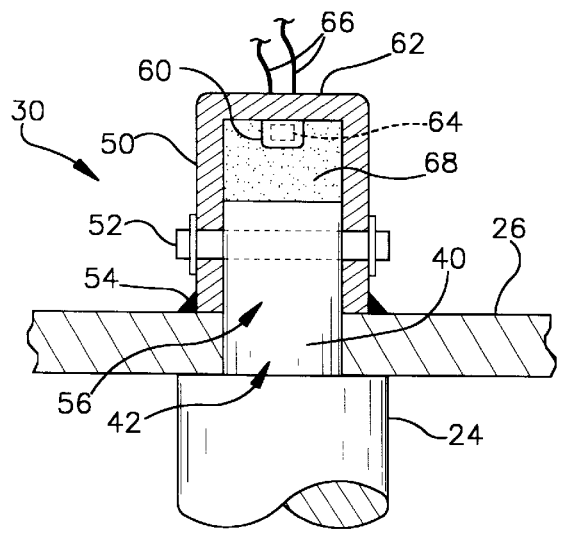
FIG. 2 is an enlarged partial view of parts of the apparatus of FIG. 1.

The disconnect device 30 in the preferred embodiment is interconnected with the king pin 24 and the trailer chassis 26 so as to fasten the king pin 24 to the trailer chassis 26. As shown in greater detail in FIG. 2, an upper end portion 40 of the king pin 24 extends through a bore 42 in the trailer chassis 26. The disconnect device 30 includes a cylinder 50 and a shear pin 52. A circumferentially extending weld 54 mounts the cylinder 50 on the trailer chassis 26 over the bore 42. The upper end portion 40 of the king pin 24 projects upward into the cylinder 50 through an open lower end 56 of the cylinder 50, and is retained in the cylinder 50 by the shear pin 52.

The disconnect device 30 further includes an electrically actuatable initiator 60. The initiator 60 is received in the cylinder 50 between the upper end portion 40 of the king pin 24 and an upper end wall 62 of the cylinder 50. A small charge of pyrotechnic material 64 is contained in the initiator 60. The pyrotechnic material 64 is ignited in a known manner upon the passage of electric current through the initiator 60 between a pair of leads 66 projecting from the initiator 60. A main charge 68 of pyrotechnic material also is contained in the cylinder 50 between the upper end portion 40 of the king pin 24 and the upper end wall 62 of the cylinder 50.

Figure 3:
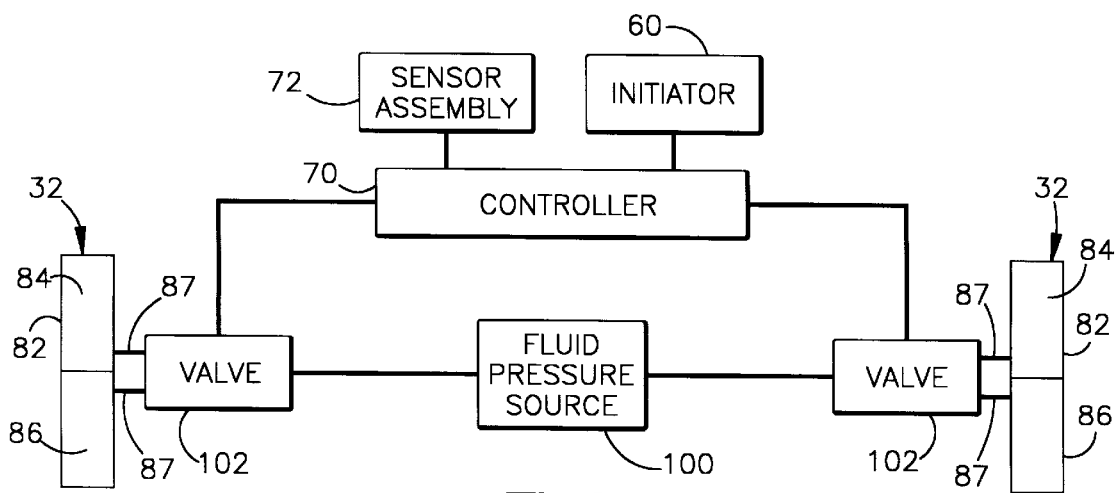
FIG. 3 is a block diagram of parts of the apparatus of FIG. 1.

As shown in FIG. 3, the safety system 14 preferably includes a controller 70 and a sensor assembly 72. The controller 70 may comprise a microprocessor of known construction. The sensor assembly 72 includes at least one sensor that senses a vehicle condition, such as deceleration or rolling, that indicates the occurrence of a crash. Such sensors are known in the art. The sensor assembly 72 in the preferred embodiment is mounted on the semitrailer 12 and is operative to sense and indicate the amount and direction of rolling of the semitrailer 12.

The output of the sensor assembly 72 may indicate rolling that meets or exceeds a specified threshold level. The specified threshold level of rolling indicates the occurrence of a crash for which uncoupling of the semitrailer 12 from the tractor 10 is desired in accordance with the present invention. The controller 70 will then respond to an output of the sensor assembly 72 by providing the initiator 60 with an actuation signal in the form of electric current that is directed between the leads 66 (FIG. 2) to ignite the pyrotechnic material 64 in the initiator 60.

When the pyrotechnic material 64 is ignited, it produces combustion products that emerge from the initiator 60 to ignite the main charge of pyrotechnic material 68. The main charge of pyrotechnic material 68 then produces additional combustion products that develop a thrust against the upper end portion 40 of the king pin 24. The shear pin 52 ruptures under the shear stress induced by the thrust. The upper end portion 40 of the king pin 24 is then propelled fully outward from the cylinder 50 and further outward from the bore 42 in the trailer chassis 26.

Figure 4:
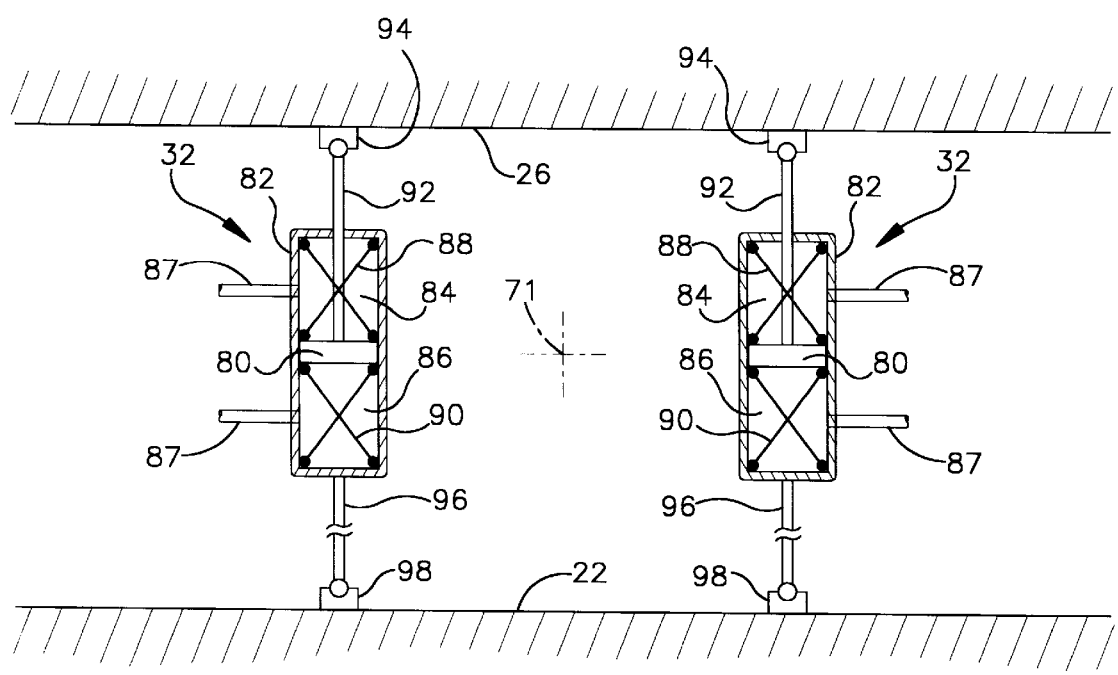
FIG. 4 is an enlarged partial view of other parts of the apparatus of FIG. 1.

As shown in FIG. 4, the rolling devices 32 are connected between the two chassis 22 and 26 on opposite sides of the longitudinal centerline 71 of the trailer chassis 26. Each rolling device 32 in the preferred embodiment is a linear actuator comprising a piston 80 and a cylinder 82. The piston 80 is located in the cylinder 82 between a pair of fluid pressure chambers 84 and 86. Each of the chambers 84 and 86 communicates with the exterior of the cylinder 82 through a corresponding fluid conduit 87. A pair of oppositely acting springs 88 and 90 bias the piston 80 to a neutral position in which the chambers 84 and 86 have equal volumes, as shown in FIG. 4.

The rolling devices 32 have output shafts 92 projecting from the upper ends of the cylinders 82. A pair of ball and socket joints 94 connect the output shafts 92 to the trailer chassis 26. A pair of anchor shafts 96 are fixed to the cylinders 82. The anchor shafts 96 project from the lower ends of the cylinders 82 to ball and socket joints 98 at which they are connected to the tractor chassis 22.

The rolling devices 32 are contractible and extendible upon longitudinal movement of the output shafts 92. When an output shaft 92 moves longitudinally inward of the corresponding cylinder 82, the piston 80 is moved downward in the cylinder 82 against the bias of the lower spring 90. The piston 80 is alternatively movable upward against the bias of the upper spring 88 upon longitudinal movement of the output shaft 92 outward of the cylinder 82. The ball and socket joints 94 and 98 enable such contraction and extension of the rolling devices 32 upon movement of the trailer chassis 26 relative to the tractor chassis 22 during steering maneuvers and other ordinary vehicle operating conditions.

As shown in FIG. 3, the rolling devices 32 are connected with a common source of fluid pressure 100 by a corresponding pair of valves 102. Each valve 102 operates under the direction of the controller 70 to pressurize one of the chambers 84 and 86, while venting the other chamber 84 or 86, in the corresponding cylinder 82. The valves 102 and the pressure source 100 may comprise any suitable pneumatic or hydraulic devices known in the art.

The output of the sensor assembly 72 may indicate rolling of the semitrailer 12 that meets or exceeds a threshold level that is specified with reference to the rolling devices 32. That threshold level of rolling is preferably greater than the threshold level described above concerning the disconnect device 30. Depending on the direction in which the semitrailer 12 is rolling, the controller 70 will respond by directing one of the valves 102 to pressurize the lower chamber 86 in one of the rolling devices 32. The controller 70 will further respond by directing the other valve 102 to pressurize the upper chamber 84 in the other rolling device 32. As a result, one of the rolling devices 32 will extend and the other will contract. The extending rolling device 32 will push the chassis 22 and 26 pivotally away from one another on one side of the centerline 71. The contracting rolling device 32 will pull the chassis 22 and 26 pivotally toward one another on the other side of the centerline 71. Such relative rolling of the chassis 21 and 26 promotes rolling of the semitrailer 12 away from the tractor 10 when the semitrailer 12 has been uncoupled from the tractor 10 upon actuation of the disconnect device 30, as described above. Moreover, the inertia of the semitrailer 12 causes the extending rolling device 32 to apply a reaction force to the tractor 10 which helps to stabilize the tractor 10. The rolling devices 32 can break away from the ball and socket joints 94 and 98 when the semitrailer 12 rolls away from the tractor 10.

The invention has been described with reference to a preferred embodiment. From the forgoing description of the invention, those skilled in the art will perceive improvements, changes and modifications. For example, the rolling devices 32 in the preferred embodiment operate under the influence of fluid pressure. Rolling devices having pyrotechnic, electrical, or other sources of energy could be used as alternatives. A disconnect device having a pneumatic, hydraulic, or other source of energy could likewise be used as an alternative for the pyrotechnically operated disconnect connect device 30. Although the sensor assembly 72 in the preferred embodiment is mounted on the semitrailer 12, it could be mounted on the tractor 10 to indicate rolling of the tractor 10. The sensor assembly 72 could further include at least one sensor on each of the tractor 10 and the semitrailer 12 to indicate rolling of those two vehicles relative to one another. Such improvements, changes and modifications within the skill of the art are intended to be covered by the appended claims.

Having described the invention, the following is claimed:

1. Apparatus comprising:

a first safety device which is actuatable to uncouple a first vehicle from a second vehicle to which the first vehicle is coupled by a pivotable joint;

a second safety device which is actuatable to roll the vehicles relative to one another; and an actuating apparatus which is operative to sense rolling of at least one of the vehicles and to respond to said rolling by actuating said safety devices.

2. Apparatus as defined in claim 1 wherein said first safety device is actuatable to unfasten a king pin from one of the vehicles.

3. Apparatus as defined in claim 1 wherein said second safety device comprises a linear actuator configured to interconnect the vehicles for relative rolling upon contraction or extension of said linear actuator.

4. Apparatus as defined in claim 3 wherein said linear actuator is one of a pair of linear actuators configured to interconnect the vehicles at locations on opposite sides of the vehicles.

5. Apparatus as defined in claim 1 wherein said actuating apparatus comprises a sensor assembly which is operative to sense and indicate said rolling, and further comprises a controller which is operative to actuate said safety devices in response to output of said sensor assembly.

6. Apparatus as defined in claim 1 wherein said actuating apparatus is operative to actuate said first safety device in response to a first threshold level of rolling of at least one of the vehicles and to actuate said second safety device in response to a second, greater threshold level of rolling of at least one of the vehicles.

7. Apparatus comprising:

a safety device which is actuatable to uncouple a first vehicle from a second vehicle to which the first vehicle is coupled by a pivotable joint, said safety device having a pyrotechnic source of energy for uncoupling the vehicles from one another; and an actuating apparatus which is operative to sense and respond to a specified vehicle crash condition by actuating said safety device.

8. Apparatus as defined in claim 7 wherein said specified vehicle crash condition is a specified level of rolling of at least one of the vehicles.

9. Apparatus as defined in claim 8 wherein said actuating apparatus comprises a sensor assembly which is operative to sense and indicate said specified level of rolling and further comprises a controller which is operative to actuate said safety device in response to output of said sensor assembly.

10. Apparatus comprising:

a safety device which is actuatable to uncouple a first vehicle from a second vehicle, the safety device including a king pin which is fastened to the second vehicle and which interlocks with a portion of the first vehicle when the vehicles are coupled to one another; and an actuating apparatus which is operative to sense and respond to a specified vehicle crash condition by actuating said safety device, when actuated said safety device unfastening the king pin from the second vehicle causing the second vehicle to become fully separated from the first vehicle.

11. Apparatus as defined in claim 10 wherein the safety device comprises a pyrotechnic source of energy for uncoupling the vehicles from one another.

12. Apparatus as defined in claim 10 wherein the actuating apparatus comprises a sensor assembly which is operative to sense and indicate the specified level of rolling and further comprises a controller which is operative to actuate the safety device in response to output of the sensor assembly.

13. Apparatus comprising:

a safety device having a linear actuator which interconnects a first vehicle and a second vehicle, the linear actuator connecting to the second vehicle in a location laterally offset from a longitudinal centerline, and an actuating apparatus which is operative to sense and respond to a specified vehicle crash condition by actuating said linear actuator, when actuated the linear actuator either contracting or extending to cause the second vehicle to roll relative to the first vehicle about the longitudinal centerline, the linear actuator disconnecting from the second vehicle after the second vehicle begins to roll.

14. Apparatus as defined in claim 13 wherein said linear actuator is one of a pair of linear actuators configured to interconnect the vehicles at locations on opposite sides of the vehicles.

15. Apparatus as defined in claim 13 wherein said specified vehicle crash condition is a specified level of rolling of at least one of the vehicles.

16. Apparatus as defined in claim 15 wherein said actuating apparatus comprises a sensor assembly which is operative to sense and indicate said specified level of rolling and further comprises a controller which is operative to actuate said safety device in response to output of said sensor assembly.

* * * * *